United States Patent Office 3,294,762
Patented Dec. 27, 1966

3,294,762
VULCANIZATION OF ELASTOMERS WITH HALO-METHANE SULFONYL CHLORIDES
John Rehner, Jr., and Peter E. Wei, Westfield, N.J., assignors to Esso Research and Engineering Company, a corporation of Delaware
No Drawing. Filed June 14, 1961, Ser. No. 116,938
14 Claims. (Cl. 260—79.3)

This invention relates to ethylene alpha-olefin copolymers vulcanized by a halomethane sulfonyl chloride.

Elastomeric, substantially amorphous, ethylene-alpha-olefin copolymers have become of increasing interest, particularly with the introduction of the low pressure processes for their preparation. These materials, being very amorphous, have low tensile strengths and low softening and melting points. The copolymers do not contain sufficient unsaturation or other functional groups so as to be capable of being cured with sulfur and other curing agents. Thus, dibasic acids, glycols, polyols, diamines, amines and metal oxides by themselves as well as other natural and synthetic rubber vulcanizing agents such as quinone dioxime, dinitrosobenzene, esters of quinone dioxime, and tetraalkyl thiuram sulfides are also ineffective.

It has now surprisingly been found that the copolymers in question can be cured or vulcanized to superior products by treating them with a halomethane sulfonyl chloride. It is surprising to learn this because, as stated previously, most conventional vulcanizing agents are ineffective with these polymers. It is particularly interesting to note that the halomethane sulfonyl chlorides work in the indicated manner because even other alkyl and aryl sulfonyl chlorides are not effective.

Of the halomethane sulfonyl chlorides such as the Br, I, F, and Cl derivatives, the chloromethane sulfonyl chlorides are superior such as the $Cl_2HC-$ and $ClH_2C-$derivatives. Particularly effective and convenient for use is trichloromethane sulfonyl chloride.

The vulcanization of the polymers is effected by thorough contacting of the polymer with the curing agent and fillers as desired, e.g., on a rubber mill or in a Banbury mixer, and subjecting the resulting mixture to temperatures of 200 to 450° F., preferably 250 to 350° F., and for from 5 to 120 minutes, preferably 10 to 60 minutes.

The halomethane sulfonyl chloride is utilized in an amount of from 0.5 to 20 parts by weight per 100 parts of polymer, preferably between about 1 to 10 parts.

Various metal compounds can additionally be employed in the vulcanization. The metal compounds that can be so used are, e.g., the carbonates, oxides, sulfides, nitrates, phosphates, sulfates, and organic acid salts of zinc, calcium, magnesium, and cadmium. Particularly effective are zinc metal and the zinc metal derivatives (Zn stearate, ZnO, ZnS, $ZnCO_3$). The oxides are selected from the group consisting of zinc, calcium, magnesium, lead, aluminum, silicon, vanadium, titanium, barium, iron, antimony, or cadmium. Especially effective and desirable is zinc oxide. The metal compound is utilized in an amount of from 0.1 to 50 parts by weight per 100 parts of polymer with 1 to 10 parts being preferred.

Sulfur can also advantageously be used in an amount of from 0.1 to 10 parts per 100 parts of polymer.

Fillers are also desirable and a variety of carbon blacks, clays, and whitings may be used. Molecular sieves also can be employed. Best results are obtained with semireinforcing or highly reinforcing furnace and channel carbon blacks such as Pelletex NS, Kosmobile S–66, Philblack O, Spheron 9, etc. The amount of carbon black used can be from 5 parts to 200 parts by weight, but more generally 10 to 70 parts per 100 parts of polymer.

The polymers cured according to this invention are the low pressure, substantially amorphous (having less than about 5 wt. percent crystallinity) copolymers of ethylene and other alpha olefins. The copolymers thus include $C_3$ to $C_5$ alpha olefins such as propylene, butene-1, and pentene-1. Propylene is particularly preferred as the other alpha olefin.

For the purpose of convenience, details of the low pressure catalytic process and the products obtained thereby are presented below, although it should be realized that these by themselves constitute no part of this invention. The process is generally described in the literature, e.g., see "Scientific American," September 1957, pages 98, et seq.

In that process the polymers are prepared by copolymerizing the monomers with the aid of certain polymerization catalysts. The catalysts are solid, insoluble reaction products obtained by partially reducing a heavy metal compound usually the halide of a Group IV–B, V–B and VI–B metal of the Periodic System, such as vanadium tetrachloride, $VOCl_3$, or a titanium halide, e.g., $TiCl_4$, $TiBr_4$, etc. The product is then activated with an aluminum alkyl compound corresponding to the formula RR'AlX. In this formula, R, R' and X preferably are alkyl groups of 2 to 8 carbon atoms, although X may alternatively be hydrogen or halogen, notably chlorine. Typical examples of the aluminum alkyl compounds are aluminum triethyl, aluminum sesquichloride, aluminum triisobutyl, etc.

The monomers are then contacted with the resulting catalyst in the presence of inert hydrocarbon solvents such as isopentane, n-heptane, xylene, etc. The polymerization is conveniently effected at temperatures of about 0° to 100° C. and pressures ranging from about 0 to 500 p.s.i.g., usually 0 to 100 p.s.i.g. The catalyst concentration in the polymerization zone is preferably in the range of about 0.1 to 0.5% based on the total liquid, and the polymer product concentration in the polymerization zone is preferably kept between about 2 to 15% based on total contents, so as to allow easy handling of the polymerization mixture. The proper polymer concentration can be obtained by having enough of the inert diluent present or by stopping the polymerization short of 100% conversion. When the desired degree of polymerization has been reached, a $C_1$ to $C_8$ alkanol such as isopropyl alcohol or n-butyl alcohol, is normally added to the reaction mixture for the purpose of dissolving and deactivating the catalyst and for precipitating the polymer product from solution. After filtration, the solid polymer may be further washed with alcohol or acid such as hydrochloric acid, dried, compacted and packaged.

It is to be understood that the term "low pressure" polymer as used herein connotes material prepared in the indicated manner.

The ethylene-propylene copolymers in general have a molecular weight of 25,000 to 1,000,000 as determined from viscosity measurements in tetralin solution, according to the method published by G. Moraglio, La Chimica e L'Industria, volume 41, page 984, 1959, and the amount of ethylene in the copolymers can range from 20 to 100 mole percent, but preferably from 30 to 90 mole percent. The copolymers are further characterized by the following properties: densities ranging from 0.85 to 0.90; percentage by weight insoluble in normal heptane at room temperature, ranging from 10 to 40%; and crystallinity content, as determined by X-ray diffraction, ranging from 0 to 15%. The exact values of these physical characteristics depend on the particular composition of the copolymer, and the conditions of synthesis, catalyst used, etc.

This invention and its advantages will be better understood by reference to the following examples.

*Example 1*

An ethylene-propylene copolymer was vulcanized with trichloromethane sulfonyl chloride. Details and results are given in the following table:

TABLE.—VULCANIZATION OF ETHYLENE-PROPYLENE COPOLYMERS BY MEANS OF TRICHLOROMETHANE SULFONYL CHLORIDE: EFFECT OF INDIVIDUAL AND COMBINED COMPONENTS

|  | (All parts by weight) [a] | | | | | | |
| --- | --- | --- | --- | --- | --- | --- | --- |
|  | 1 | 2 | 3 | 4 | 5 | 6 | 7 |
| Ethylene-propylene copolymer [b] | 100 | 100 | 100 | 100 | 100 | 100 | 100 |
| Carbon black (Philblack O) | 50 | 50 | 50 | 50 | 50 | 50 | 50 |
| Sulfur | 0 | 2 | 0 | 2 | 2 | 0 | 2 |
| Zinc oxide | 0 | 2.5 | 0 | 0 | 2.5 | 0 | 0 |
| Zinc sulfide | 0 | 0 | 0 | 0 | 0 | 2.5 | 2.5 |
| Trichloromethane sulfonyl chloride | 0 | 0 | 2.5 | 2.5 | 2.5 | 2.5 | 2.5 |
| Cured [c] 30 min./320° F.: |  |  |  |  |  |  |  |
| Tensile strength, p.s.i | 360 | 300 | 360 | 530 | 1,640 | 560 | 1,650 |
| Elongation, percent | 700 | 550 | 550 | 600 | 530 | 600 | 530 |

[a] Mixed on a laboratory rubber mill at room temperature.
[b] This product contained 39.6 mole percent of propylene units, and had an intrinsic viscosity of 4.09, measured in tetralin at 125° C.
[c] Press-cured micropads about 20 mils thick. Tensile values determined on Scott Microtester at room temperature and stretching rate of 10 inches per minute.

The tensile and elongation data in Example 1 illustrate that while trichloromethane sulfonyl chloride alone has vulcanizing activity in ethylene-propylene copolymer compositions, in conjunction with sulfur or with a zinc compound, and especially when it is used with both sulfur and a zinc compound, excellent vulcanizing activity is observed.

*Example 2*

The ethylene-propylene copolymer of Example 1 was vulcanized in a similar manner except that $TiO_2$, CdO, $V_2O_5$, $Sb_2O_3$, PbO, $Fe_2O_3$, $Al_2O_3$ and BaO, and $SiO_2$ were substituted for the zinc oxide. Here, too, superior products were obtained equivalent to others obtained with ZnO.

*Example 3*

A copolymer was vulcanized as indicated in the following table:

VULCANIZATION OF ETHYLENE-PROPYLENE ELASTOMER WITH DICUMYL PEROXIDE-SULFUR-TRICHLOROMETHANE SULFONYL CHLORIDE

[320° F./30 min.]

|  | 1 | 2 | 3 |
| --- | --- | --- | --- |
| Elastomer [1] | 100 | 100 | 100 |
| HAF Black | 50 | 50 | 50 |
| Sulfur | 2 | 2 | 2 |
| Zinc oxide | 5 | 5 | 5 |
| Trichloromethane Sulfonyl Chloride | 0 | 5 | 5 |
| Dicumyl peroxide | 4 | 0 | 4 |
| Tensile Strength,[2] p.s.i | 3,030 | 2,000 | 2,350 |
| 300% Modulus, p.s.i | 1,150 | 850 | 850 |
| Elongation, percent | 600 | 600 | 630 |
| Tear Strength,[3] p.s.i., at— |  |  |  |
| Room Temperature | 240 | 330 | 340 |
| 212° F | 140 | 150 | 200 |

[1] Ethylene-propylene copolymer 48.5% by mole of propylene units with intrinsic viscosity of 5.2 as determined in decalin at 135° C.
[2] Tested on a 6" x 6" pad of 70 to 80 mil thickness.
[3] ASTM procedure D 624-52, Die B.

This table demonstrates that the sulfur-dicumyl peroxide system vulcanizes ethylene-propylene copolymer compositions, as is known from the prior art. It also demonstrates that the sulfur-trichloromethane sulfonyl chloride system vulcanizes these copolymer compositions, either in the presence or absence of the organic peroxide. More important, the data show that the presence of trichloromethane sulfonyl chloride serves to enhance the tear strengths, either at room temperature or at elevated temperatures, over the tear strength values obtained with the sulfur-peroxide systems of the prior art.

*Example 4*

A copolymer was vulcanized as indicated in the following table:

FURTHER DATA ON THE USE OF METAL COMPOUNDS ON THE VULCANIZATION OF ETHYLENE-PROPYLENE ELASTOMERS WITH TRICHLOROMETHANE SULFONYL CHLORIDE

|  | 1 | 2 | 3 |
| --- | --- | --- | --- |
| Elastomer [1] | 100 | 100 | 100 |
| HAF Black | 50 | 50 | 50 |
| Sulfur | 0 | 1 | 2 |
| Zinc Oxide | 0 | 0 | 0 |
| Trichloromethane Sulfonyl Chloride | 2.5 | 2.5 | 5 |
| $PbO_2$ | 5 | 5 | 0 |
| Calcium stearate | 0 | 0 | 5 |
| 280° F./30 min.: |  |  |  |
| Tensile strength, p.s.i | 480 | 1,890 | 1,850 |
| Elongation, percent | 600 | 580 | 600 |
| 320° F./30 min.: |  |  |  |
| Tensile strength, p.s.i | -------- | -------- | 2,330 |
| Elongation, percent | -------- | -------- | 500 |
| 335° F./30 min.: |  |  |  |
| Tensile strength, p.s.i | 400 | 2,360 | 2,430 |
| Elongation, percent | 450 | 530 | 500 |

[1] Ethylene propylene copolymer 48.5% by mole of propylene units with intrinsic viscosity of 5.2 as determined in decalin at 135° C.

This table shows the efficacy of additional metal compounds.

*Example 5*

The effect of the trichloromethane sulfonyl chloride concentration is shown in the following table:

EFFECT OF CONCENTRATION OF TRICHLOROMETHANE SULFONYL CHLORIDE ON VULCANIZATION OF ETHYLENE-PROPYLENE ELASTOMER

|  | 1 | 2 | 3 | 4 | 5 |
| --- | --- | --- | --- | --- | --- |
| Elastomer [1] | 100 | 100 | 100 | 100 | 100 |
| HAF Black | 50 | 50 | 50 | 50 | 50 |
| Sulfur | 2 | 2 | 2 | 2 | 2 |
| Zinc oxide | 5 | 5 | 5 | 5 | 5 |
| Trichloromethane sulfonyl chloride | 0 | 2.5 | 4 | 6 | 10 |
| 280° F./30 min.: |  |  |  |  |  |
| Tensile strength, p.s.i | 710 | 1,530 | 2,500 | 2,960 | 3,200 |
| Elongation, percent | 600 | 580 | 430 | 500 | 500 |
| 320° F./30 min.: |  |  |  |  |  |
| Tensile strength, p.s.i | 640 | 1,280 | 2,470 | 3,060 | 3,050 |
| Elongation, percent | 700 | 450 | 450 | 400 | 500 |
| 335° F./30 min.: |  |  |  |  |  |
| Tensile strength, p.s.i | -------- | 1,470 | 2,750 | 3,050 | 3,230 |
| Elongation, percent | -------- | 550 | 430 | 500 | 430 |

[1] Ethylene-propylene copolymer containing 36.5 mole percent propylene units in the copolymer and had intrinsic viscosity of 4.85 as determined in decalin at 135° C.

This example demonstrates that satisfactory vulcanizates can be obtained with as little as 2.5 parts or less of the trichloromethane sulfonyl chloride. Improved vulcanizates result from the use of higher dosages, but little is gained by going beyond 6 or 7.

*Example 6*

Various analogs of trichloromethane sulfonyl chloride were employed in determining their effect on the vulcanization of ethylene-propylene elastomers. This data is recorded in the table following:

TABLE

|  | 1 | 2 | 3 | 4 | 5 | 6 | 7 | 8 | 9 | 10 | 11 |
|---|---|---|---|---|---|---|---|---|---|---|---|
| Elastomer* | 100 | 100 | 100 | 100 | 100 | 100 | 100 | 100 | 100 | 100 | 100 |
| HAF Black | 50 | 50 | 50 | 50 | 50 | 50 | 50 | 50 | 50 | 50 | 50 |
| Sulfur | 2 | 2 | 2 | 2 | 2 | 2 | 2 | 2 | 2 | 2 | 2 |
| Zinc oxide | 5 | 5 | 5 | 5 | 5 | 5 | 5 | 5 | 5 | 5 | 5 |
| Chem. Agent | None | (a) | (a) | (b) | (b) | (c) | (d) | (e) | (f) | (g) | (h) |
| Wt | None | 5 | 5 | 5 | 5 | 5 | 5 | 5 | 5 | 5 | 5 |
| 280° F./15 min.: |  |  |  |  |  |  |  |  |  |  |  |
| Tensile, p.s.i | 710 | 240 | 390 | 550 | 500 | 380 | 330 | 480 | 440 | 320 | 440 |
| Elongation, percent | 600 | 150 | 730 | 700 | 600 | 680 | 600 | 600 | 630 | 800 | 650 |
| 280° F./30 min.: |  |  |  |  |  |  |  |  |  |  |  |
| Tensile, p.s.i |  |  |  |  | 500 | 450 |  |  | 450 | 340 | 480 |
| Elongation, percent |  |  |  |  | 600 | 650 |  |  | 600 | 680 | 680 |
| 320° F./30 min.: |  |  |  |  |  |  |  |  |  |  |  |
| Tensile, p.s.i | 640 |  |  |  | 480 | 340 | 330 |  | 320 | 270 | 350 |
| Elongation, percent | 700 |  |  |  | 680 | 550 | 600 |  | 530 | 530 | 450 |

|  | 12 | 13 | 14 | 15 | 16 | 17 | 18 | 19 | 20 | 21 | 22 |
|---|---|---|---|---|---|---|---|---|---|---|---|
| Elastomer* | 100 | 100 | 100 | 100 | 100 | 100 | 100 | 100 | 100 | 100 | 100 |
| HAF Black | 50 | 50 | 50 | 50 | 50 | 50 | 50 | 50 | 50 | 50 | 50 |
| Sulfur | 2 | 2 | 2 | 2 | 2 | 2 | 2 | 2 | 2 | 2 | 1 |
| Zinc oxide | 5 | 5 | 5 | 5 | 5 | 5 | 5 | 5 | 5 | 5 | 2 |
| Chem. Agent | (i) | (j) | (k) | (l) | (m) | (n) | (o) | (p) | (q) | (r) | (s) |
| Wt | 5 | 5 | 5 | 5 | 5 | 5 | 10 | 10 | 10 | 5 | 10 |
| 280° F./15 min.: |  |  |  |  |  |  |  |  |  |  |  |
| Tensile, p.s.i | 410 | 420 | 360 | 370 | 500 | 480 | 700 | 220 | 610 | 440 |  |
| Elongation, percent | 730 | 750 | 530 | 630 | 600 | 730 | 600 | 450 | 550 | 450 |  |
| 280° F./30 min.: |  |  |  |  |  |  |  |  |  |  |  |
| Tensile, p.s.i | 410 | 500 | 430 | 380 |  | 500 |  |  |  |  |  |
| Elongation, percent | 650 |  | 500 | 700 |  | 680 |  |  |  |  |  |
| 320° F./30 min.: |  |  |  |  |  |  |  |  |  |  |  |
| Tensile, p.s.i | 280 | 420 |  | 400 |  | 440 |  |  |  | 230 | 630 |
| Elongation, percent | 400 | 700 |  | 630 |  | 500 |  |  |  | 300 | 700 |

*Ethylene-propylene copolymer containing 36.5 mole percent of propylene units, and having an intrinsic viscosity of 4.4 as measured in tetralin at 125° C.
a n-Nitrobenzene sulfonyl fluoride.
b p-Toluene sulfonyl chloride.
c m-Nitrobenzene sulfonyl chloride.
d O-nitrobenzene sulfonyl chloride.
e p-Nitrobenzene sulfonyl chloride.
f p-Brombenzene sulfonyl chloride.
g p-Phenylazobenzene sulfonyl chloride.
h 2,4-dimethylbenzene sulfonyl chloride.
i 2,5-dichlorobenzene sulfonyl chloride.
j 3,4-dichlorobenzene sulfonyl chloride.
k 1,3,5-benzene-tri-sulfonyl chloride.
l 2-naphthalene sulfonyl chloride.
m N-acetyl sulfanilyl chloride.
n m-Chloro sulfonyl benzoyl chloride.
o p-Nitrobenzoyl chloride.
p Diphenylcarbamyl chloride.
q p-Phenylazobenzoyl chloride.
r p-Fluorobenzene sulfonyl chloride.
s 1-butane sulfonyl chloride.

This example demonstrates the specificity of halomethane sulfonyl chlorides. The various aromatic sulfonyl chlorides shown in the table, and also the unsubstituted alkyl sulfonyl chloride (1-butane sulfonyl chloride) are ineffective under conditions where the trichloromethane sulfonyl chloride is very effective, as shown in the previous examples.

Blends of ethylene-propylene copolymers were prepared with other rubbers. Among these other rubbers were natural rubber, Paracril, SBR, butyl, chlorobutyl, neoprene, and cispolybutadiene. The behavior of the trichloromethane sulfonyl chloride system in these blends is rather specific. That is, it displays vulcanizing activity in blends of ethylene-propylene copolymers with Paracril, SBR, neoprene, or cis-polybutadiene; but it is ineffective in the blends with natural rubber, butyl, or chlorobutyl.

As stated previously, the vulcanizing agents of this invention can be employed in blends with other rubbers as well as the elastic copolymers for which they are primarily intended.

The advantages of this invention will be apparent to those skilled in the art. Cured polymer products are provided of improved tensile strength and other physical characteristics in an economic manner, with emphasis on the improved tear strengths which these vulcanizates exhibit over those prepared with sulfur-organic peroxide cures as in the prior art.

It is to be understood that this invention is not limited to the specific examples which have been offered merely as illustrations, and that modifications may be made without departing from the spirit of the invention.

What is claimed is:

1. A composition of matter comprising an elastomeric ethylene and $C_3$ to $C_5$ alpha-olefin copolymer and from about 0.5 to 20 parts by weight of a halomethane sulfonyl chloride per 100 parts by weight of said copolymer and from 0.1 to 10 parts of sulfur per 100 parts of said copolymer.

2. The composition of claim 1 in which the halomethane sulfonyl chloride is a chloromethane sulfonyl chloride.

3. The composition of claim 2 in which the chloromethane sulfonyl chloride is trichloromethane sulfonyl chloride.

4. The composition of claim 3 in which the copolymer is an ethylene-propylene copolymer.

5. The composition of claim 4 in which the ethylene is present in the copolymer in an amount of from 30 to 90 mole percent.

6. A process for curing an elastomeric ethylene/$C_3$ to $C_5$ alpha-olefin copolymer which comprises mixing 0.5 to 20 parts by weight of a halomethane sulfonyl chloride and from 0.1 to 10 parts of sulfur per 100 parts of copolymer with said copolymer and heating the resulting mixture to at least 200° F.

7. Process for curing an elastomeric ethylene-propylene copolymer which comprises mixing about 0.5 to 20 parts by weight of a chloromethane sulfonyl chloride and from 0.1 to 10 parts of sulfur with each 100 parts by weight of said copolymer and heating the resulting mixture for from about 5 to 120 minutes to about 250 to 350° F.

8. The process of claim 7 in which the copolymer is also mixed with 1 to 10 parts by weight of zinc oxide and about 0.1 to 10 parts by weight of sulfur prior to heating the resulting mixture.

9. A sulfur curable composition of matter consisting essentially of an elastomeric ethylene/$C_3$ to $C_5$ alpha-olefin copolymer admixed with about 0.5 to 20 parts by weight of a halomethane sulfonyl chloride per 100 parts by weight of said copolymer.

10. The composition of claim 9 in which the alpha-olefin is propylene.

11. The composition of claim 10 in which the copolymer is admixed with about 1 to 10 parts by weight of zinc oxide and about 0.1 to 10 parts by weight of sulfur.

12. The composition of claim 10 in which dicumyl peroxide is admixed with the copolymer.

13. The composition of claim 12 wherein about 0.1 to 50 parts by weight of a metal compound wherein the metal portion is chosen from the group consisting of zinc, calcium, magnesium, and cadmium is admixed with the copolymer.

14. The composition of claim 13 wherein said halomethane sulfonyl dichloride is trichloromethane and said copolymer is also admixed with about 1 to 10 parts by weight of zinc oxide and about 0.1 to 10 parts by weight of sulfur.

References Cited by the Examiner

UNITED STATES PATENTS

| | | | |
|---|---|---|---|
| 3,012,016 | 12/1961 | Kirk et al. | 260—79.5 |
| 3,041,321 | 6/1962 | Youngman et al. | 260—88.2 |
| 3,047,552 | 7/1962 | Reynolds | 260—88.2 |
| 3,088,929 | 5/1963 | Makowski et al. | 260—79.5 |

OTHER REFERENCES

Ind. and Eng. Chem.: Sturgis, vol. 39, No. 1, January 1947, pp. 64–68; pp. 66–67 relied on.

Rubber and Plastics Age, Natta, vol. 42, January 1961, pp. 53–58.

JOSEPH L. SCHOFER, *Primary Examiner.*

MORRIS LIBERMAN, LEON J. BERCOVITZ,
*Examiners.*

E. J. SMITH, M. P. HENDRICKSON, J. F. McNALLY, D. K. DENENBERG, *Assistant Examiners.*